(12) United States Patent
Blessing

(10) Patent No.: US 8,405,378 B2
(45) Date of Patent: Mar. 26, 2013

(54) CURRENT GENERATING DEVICE FOR THE GENERATION AND SIMULTANEOUS MONITORING OF A MEASURING CURRENT

(75) Inventor: Andreas Blessing, Tennenbronn (DE)

(73) Assignee: VEGA Grieshaber KG, Wolfach (DE)

( * ) Notice: Subject to any disclaimer, the term of this patent is extended or adjusted under 35 U.S.C. 154(b) by 556 days.

(21) Appl. No.: 12/694,878

(22) Filed: Jan. 27, 2010

(65) Prior Publication Data

US 2010/0211342 A1 Aug. 19, 2010

Related U.S. Application Data

(60) Provisional application No. 61/152,369, filed on Feb. 13, 2009.

(30) Foreign Application Priority Data

Feb. 13, 2009 (EP) ..................................... 09152814

(51) Int. Cl.
*G01R 31/02* (2006.01)

(52) U.S. Cl. ........................................................ 324/72

(58) Field of Classification Search .................. 324/126, 324/127, 355–357, 431, 207.12, 225, 669, 324/684, 720; 73/54.16, 61.57, 765, 861.01, 73/708, 23.21, 447; 702/1, 57, 64, 108, 116, 702/117, 127, 138, 182, 183; 321/348, 522, 321/713, 126, 127, 355–357, 431, 207.12, 321/225, 669, 684, 720

See application file for complete search history.

(56) References Cited

U.S. PATENT DOCUMENTS

| 4,619,140 A | 10/1986 | Kühnel |
| 4,849,754 A | 7/1989 | Maltby et al. |
| 5,510,779 A * | 4/1996 | Maltby et al. ............... 340/870.3 |
| 6,256,590 B1 * | 7/2001 | Keech .............................. 702/45 |
| 7,932,714 B2 * | 4/2011 | Fauveau ......................... 324/126 |
| 8,154,310 B1 * | 4/2012 | Maharyta et al. ............. 324/686 |
| 2006/0167644 A1 | 7/2006 | Muller |

FOREIGN PATENT DOCUMENTS

| DE | 42 32 720 | 3/1994 |
| FR | 2 447 540 | 8/1980 |
| GB | 2 056 695 | 3/1981 |
| WO | 2006/104712 | 10/2006 |

* cited by examiner

*Primary Examiner* — Jermele M Hollington
*Assistant Examiner* — Alesa Allgood
(74) *Attorney, Agent, or Firm* — Fay Kaplun & Marcin, LLP

(57) ABSTRACT

The generation and monitoring of a load-independent output current for a level meter, pressure gauge, flowmeter or evaluation device are described. A current that is equal or unequal to the measuring current, but inverted relative thereto, can be generated continuously or within certain time intervals in a switching circuit that is realized independently of the network generating the measuring current. The generated current can be fed into the measuring circuit at a comparison point and added. The compensation principle makes it possible to determine whether the measuring current corresponds to the nominal value, wherein a testing current is fed into the first electric circuit by means of a second switching circuit that contains a second current source. A certain expectancy value of a voltage to be tapped can be calculated in dependence on the testing current being fed in and the nominal value. If the measured voltage deviates from the expectancy value, a deviation of the measuring current from the nominal value is detected and can be output for a user.

11 Claims, 2 Drawing Sheets

CURRENT GENERATING DEVICE FOR THE GENERATION AND SIMULTANEOUS MONITORING OF A MEASURING CURRENT

REFERENCE TO RELATED APPLICATIONS

This application claims the benefit of the filing date of EP Patent Application Serial No. EP 09 152 814.1 filed 13 Feb. 2009 and U.S. Provisional Patent Application Ser. No. 61/152,369 filed 13 Feb. 2009, the disclosure of both applications is hereby incorporated by reference.

FIELD OF THE INVENTION

The invention relates to the generation and monitoring of electric currents. The invention particularly pertains to a current generating device for the generation and simultaneous monitoring of a measuring current for a level meter, pressure gauge or flowmeter, to a level meter with a current generating device, to a pressure gauge with a current generating device, to a flowmeter with a current generating device, to a method for the generation and simultaneous monitoring of a measuring current, to a program element and to a computer-readable medium.

TECHNOLOGICAL BACKGROUND

Field devices such as, for example, level meters, pressure gauges and flowmeters are extensively utilized in various areas of today's industrial life in order to determine measured values in tanks or tubes. The measured values are transmitted to control or management centers by means of different data transmission technologies. In this case, the analog and the digital radio transmission on the basis of electromagnetic waves is one preferred means, for example, for forwarding levels determined by a corresponding sensor in the field to the central office.

If part of the transmission is bound to electrical lines, the measured value to be forwarded is transmitted with the aid of an electric current in accordance with the two-wire or four-wire technique. This measuring current that is output, for example, proportionally to the physically existing measured value in a current loop may be used for a safety function in a safety-relevant monitoring circuit under certain circumstances. In this case, a deviation between the actually generated measuring current and the applicable nominal value that corresponds to the actually existing physical measured value may occur for various technical reasons. One reason for such a deviation may be, for example, the failure of a component in a current-defining network.

SUMMARY OF THE INVENTION

A current generating device for the generation and simultaneous monitoring of a measuring current for a level meter, pressure gauge or flowmeter, a level meter, a pressure gauge, a flowmeter, a method for the generation and simultaneous monitoring of a measuring current, a program element and a computer-readable medium are disclosed.

The described exemplary embodiments likewise pertain to the current generating device, the level meter, the pressure gauge, the flowmeter and the method.

It should be noted that the term "sensor" in the context of the invention also relates to the terms "level meter," "pressure gauge" or "flowmeter," as well as other measuring devices. The term "sensor value" analogously relates to the term "measured value."

In addition, the term "expectancy value" in the context of the invention refers to the value of the compensating voltage or the compensating current at the time, at which the measuring current corresponds to the nominal value. This expectancy value also depends on the chosen value of the applied testing current.

The term "current source" in the context of the invention also means that a load-independent current can be output by this current source.

According to one exemplary embodiment of the invention, a current generating device for the generation and simultaneous monitoring of a measuring current for a level meter, pressure gauge or flowmeter is disclosed. In this case, the current generating device features a first current source for generating a measuring current and a second current source for generating a compensating current. In this case, the compensating current serves for compensating at least part of the measuring current. The current generating device furthermore features a detection circuit for detecting a deviation of the measuring current from a nominal value on the basis of the compensating current.

In this case, the current generating device may consist, for example, of two independent switching circuits that respectively contain one of the described current sources. It is furthermore possible to arrange these two switching circuits on a circuit board and to integrate these switching circuits into the circuit board in the form of integrated circuits. The current generating device may also form an integral part of the level meter, pressure gauge or flowmeter. However, it would also be possible to realize a current generating device that is arranged distant from the measuring device in the form of a separate external device.

The measuring current furthermore corresponds to a measured value that was previously read in or determined by a sensor. In this case, the measuring current is generated by the first current source, for example, due to a control or adjustment of the first current source by a microcontroller. In this case, the measuring current is proportional to the measured value that was determined by the sensor.

The measuring current can furthermore be referred to as a load-independent output current of the first current source that flows within a first current loop or within a first electric circuit. The term "load-independent current" refers to the fact that the current of the current source essentially can be maintained constant independently of a resistor in the loop. However, it may also consist of an alternating current with any frequency and wave form. Its value is largely independent of the load resistor in the first electric circuit.

It should furthermore be noted that the compensating current corresponds to the respective compensating voltage. In the context of the invention, the generation, the measurement and a comparison of the compensating current analogously may always be based on the compensating voltage.

The detection circuit may furthermore be realized, for example, in the form of a simple circuit for the voltage measurement between a first junction or comparison point and a reference point such as, for example, a microcontroller. However, it would also be conceivable to realize a circuit of a more complex type.

One important aspect in the detection of a deviation of the measuring current from a nominal value is the measurement of the compensating current or the compensating voltage at a corresponding location. For example, it is possible to measure the compensating voltage that drops at a first current-sensing resistor unit that may consist of an electrical resistor. However, it would also be conceivable to use other electric, electronic, optical or magnetic detection methods. After a preceding measurement of the compensating voltage, the measured value of the compensating voltage is compared with a predetermined and/or stored expectancy value.

In other words, an expectancy value for the magnitude of the compensating current or for the magnitude of the compensating voltage is provided for the current generating device and serves as the basis for detecting a deviation. In this case, the expectancy value, for example, may be zero, but also unequal to zero. The detection is realized by comparing the measuring result of the compensating voltage with the expectancy value and a user can, if applicable, be notified accordingly in case of a deviation. It is also possible to readjust the current source that generates the measuring current.

It may furthermore be possible, for example, to store the nominal value of the measuring current in the second current source. However, it is also possible to store this nominal value externally within a microcontroller that controls and adjusts the two current sources. In this case, the nominal value corresponds to the measuring current that should the present in the complete system consisting of the current generating device, the sensor and all elements of the data transmission to the central office in a correctly functioning system and in the absence of any faults.

The compensating current may result, for example, from the addition of the measuring current and the testing current generated by the second current source. This addition may physically take place, for example, at the comparison point described below.

The testing current $I_{test}$ may, for example, be equal to the inverted nominal value, i.e., $-I_{nominal}$. However, it would also be possible to consider the infeed of a testing current, the magnitude of which corresponds to a multiple of the inverted nominal value: $I_{test}=x(-I_{nominal})$, wherein x may be any positive or negative fractional rational number. The expectancy value of the compensating voltage results in dependence on the chosen value of this testing current.

Due to the monitoring of the measuring current in accordance with this exemplary embodiment of the invention, it is possible to disclose a monitoring of the measuring current, e.g., in the form of a load-independent output current, that is independent of non-linearities, temperature changes, resolutions or limitations of, for example, an analog-digital converter and inaccuracies of references.

If the nominal value $I_{nominal}$ as well as the testing current $I_{test}$ are carried via the same electronic network (e.g., the resistor 108 in the following FIG. 1), deviations with respect to its physical properties may cancel each either out because the compensation principle also applies in this case. Non-linearities of the component or network and value changes due to temperature fluctuations during the operation can be cited as examples.

According to this exemplary embodiment, it may therefore no longer be necessary to completely or partially map the measuring current in a special network and/or to transmit the measuring current in an additional monitoring circuit for a comparison with potential nominal values.

According to one exemplary embodiment of the invention, the current generating device features a current-sensing resistor unit, wherein the compensating current flows through the current-sensing resistor unit.

The value of the deviation of the measuring current from the nominal value therefore can be detected with the aid of a voltage measurement on the current-sensing resistor unit. In other words, the current generating device may be realized in such a way that the compensating current or the compensating voltage is proportional to the deviation of the measuring current from a nominal value. One possible exemplary embodiment of this type is illustrated in the following FIG. 1.

According to another exemplary embodiment of the invention, a current generating device is disclosed, in which the first current source supplies a first electric circuit and the second current source feeds a testing current into the first electric circuit. The current generating device is furthermore realized in such a way that the infeed of the testing current generates the compensating current.

This exemplary embodiment is described, among other things, in the following FIG. 1. In other words, a current that is equal or unequal to the measuring current, but inverted relative thereto, is generated continuously or within certain desired time intervals in a switching circuit that is realized independently of the network generating the measuring current, wherein this current is fed into the first electric circuit at a comparison point. The cumulative current at this comparison point is monitored, i.e., measured, at the time of the infeed and needs to have an expectancy value if the function of the system is intact. This corresponds to a measurement and, if applicable, the detection of a deviation on the basis of the compensation principle.

In other words, the compensating current is generated in the first electric circuit, in which the measuring current also flows. This first electric circuit is designed for transmitting the measured value to a display or control unit by means of the electric measuring current.

According to another exemplary embodiment of the invention, the current generating device is realized in such a way that, if the testing current corresponds to the nominal value, a compensating current other than zero is only generated if the measuring current deviates from the nominal value.

In other words, no compensating voltage drops occur, for example, at a current-sensing resistor unit in the first electric circuit in instances, in which the measuring current was flawlessly generated and transmitted. In this case, the expectancy value for the compensating voltage would be 0V. This expectancy value may also be stored, for example, in a microcontroller, to which the signal of the measurement of the compensating voltage is transmitted.

According to another exemplary embodiment of the invention, the current generating device is furthermore realized in such a way that, if the testing current corresponds to a multiple of the nominal value, the detection of the deviation is realized on the basis of an expectancy value of a voltage at the current-sensing resistor unit other than zero.

In this case, the voltage can be measured, for example, between a comparison point and a microcontroller. In other words, a compensating current other than zero is also expected if the system functions flawlessly in this case, in which the testing current should correspond to a multiple of the nominal value. Consequently, the expectancy value of the compensating voltage that may be stored, for example, in a microcontroller is unequal to zero.

According to another exemplary embodiment of the invention, at least the measuring current or the compensating current is a load-independent current.

Due to this characteristic of this exemplary embodiment of the invention, it is possible, for example, to indicate the equations described in FIG. 1 in accordance with the law for the inflowing and outflowing currents at the two junctions 1 and 2. Consequently, it is ensured that a compensating voltage to be measured can be assigned to a value of the measuring current with high accuracy.

According to another exemplary embodiment of the invention, the current source is arranged in a first region that fulfills an enhanced safety requirement.

This safety requirement may be realized, for example, with the Safety Integrity Level 3 or 4 (SIL3 or 4). In this case, an electric isolation between a first and a second region may be provided on a circuit board, wherein the second region fulfills the so-called EX standard. This makes it possible to ensure that the second current source that makes it possible to utilize the compensation principle for monitoring the measuring current is reliably protected, for example, from explosions, heat or an electric flashover from other regions of the current generating device. It is furthermore possible to utilize different couplers such as, for example, optocouplers for bridging such an electric isolation. For example, unidirectional couplers can be used in order to improve the safety.

According to another exemplary embodiment of the invention, the current generating device features a microcontroller, wherein both current sources are connected to the microcontroller, and wherein a detection signal is made available to the microcontroller.

In this case, the detection signal may be the compensating voltage at an electrical resistor. However, this voltage can also be measured between a comparison point, at which the testing current is fed into the first electric circuit, and another location, e.g., a microcontroller.

Consequently, it may be possible for a microcontroller to control and adjust at least one of the two current sources. However, it is also possible to specify a sampling protocol by means of the microcontroller, wherein said sampling protocol instructs the second current source to feed the described testing current into the second electric circuit toward the desired discrete sampling side at a comparison point and to thusly make it possible to detect a deviation of the measuring current from the nominal value. This can mean a reduction of the energy consumption. However, continuous sampling is also possible.

According to another exemplary embodiment of the invention, a current generating device is disclosed, wherein the microcontroller is designed for adjusting and controlling at least one of the two current sources.

According to another exemplary embodiment of the invention, the current generating device is designed for a 4 to 20 mA two-wire loop.

A working resistance, e.g., in the form of an evaluation device, may be situated within the first electric circuit.

According to another exemplary embodiment of the invention, a level meter with a current generating device is disclosed.

According to another exemplary embodiment of the invention, a pressure gauge with a current generating device is disclosed.

According to another exemplary embodiment of the invention, a flowmeter with a current generating device is disclosed.

According to another exemplary embodiment of the invention, a method for the generation and simultaneous monitoring of a measuring current for a level meter, pressure gauge or flowmeter is disclosed, wherein the method comprises the following steps: providing a first current source, providing a second current source, providing a detection circuit for detecting a deviation of the measuring current, generating a measuring current by means of the first current source, generating a compensating current by means of the second current source, compensating at least part of the measuring current with the compensating current and detecting a deviation of the measuring current from a nominal value on the basis of the compensating current.

In other words, electric energy is fed into the first electric circuit due to the testing current, wherein this electric energy can result in a compensating voltage at a current-sensing resistor unit or between a comparison point and another location if a deviation of the measuring current from a nominal value has previously occurred. In this case, the testing current can be adjusted equal to the nominal value or unequal to the nominal value. In the first instance, a deviation is detected if a voltage other than zero can be tapped at the described location. In the second instance, a detection is forwarded to a detection point, for example, in the form of an acoustic, optical or electric signal if the value of the compensating voltage does not correspond to a previously calculated and/or stored expectancy value.

According to another exemplary embodiment of the invention, a computer-readable medium is disclosed, wherein a computer program element is stored on this computer-readable medium and instructs a processor to carry out the above-described steps when it is executed on the processor.

According to another exemplary embodiment of the invention, a computer program element is disclosed that instructs the processor to initiate the above-described steps when it is executed on the processor.

In this case, the computer program element may, for example, be part of a software that is stored on a processor of a sensor. Likewise, the computer program element can be used in a control unit or a computer unit that controls and adjusts the sensor in combination with a current generating device. This exemplary embodiment of the invention furthermore comprises a computer program element that already utilizes the invention from the beginning, as well as a program element that causes an existing program to utilize the invention by means of an update.

According to another exemplary embodiment of the invention, an evaluation device with a current generating device according to one of the preceding exemplary embodiments is disclosed.

As a supplement, it should be noted that "comprising" and "featuring" do not exclude other elements or steps, and that "an" or "a" does not exclude a plurality. It should furthermore be noted that characteristics or steps that were described with reference to one of the above exemplary embodiments can also be used in combination with other characteristics or steps of other above-described exemplary embodiments of the invention. The reference symbols in the claims should explicitly not be interpreted in a restrictive sense.

Exemplary embodiments of the invention are described below with reference to the figures.

BRIEF DESCRIPTION OF THE FIGURES

The figures show schematic illustrations that are not true-to-scale. In the following description of the figures, identical or similar elements are identified by the same reference symbols.

DETAILED DESCRIPTION OF EXEMPLARY EMBODIMENTS

Figure 1:
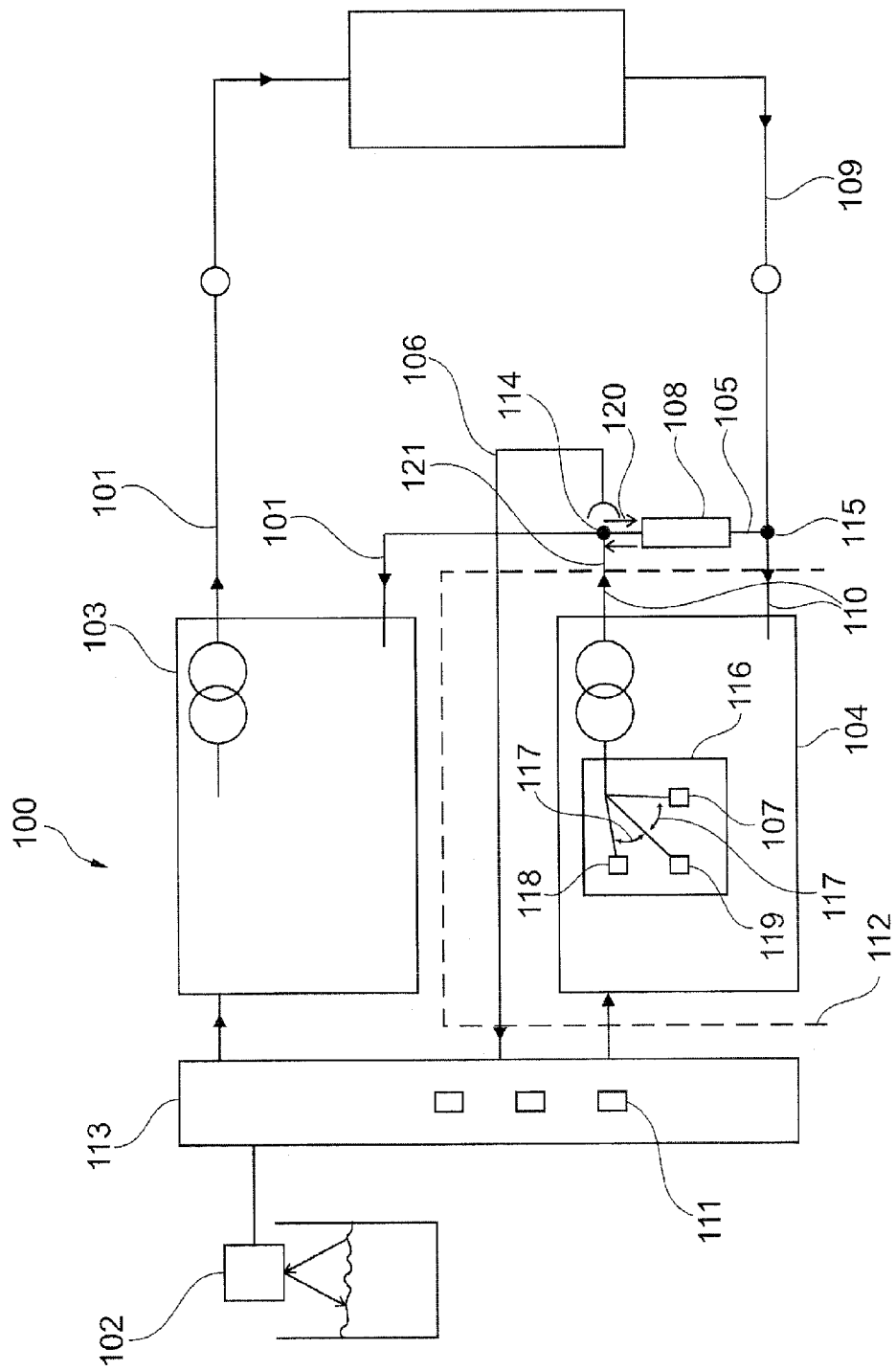
FIG. 1 shows a schematic two-dimensional illustration of a current generating device for the generation and simultaneous monitoring of a measuring current for a level meter, pressure gauge or flowmeter according to one exemplary embodiment of the invention.

FIG. 1 shows a current generating device 100 for the generation and simultaneous monitoring of a measuring current 101 that corresponds to a measured value of a sensor 102.

This figure shows a first current source 103 that generates the measuring current 101. This current is a load-independent output current of the current source 103. This figure furthermore shows a second current source 104 that feeds the testing current 110 into the first electric circuit 109. The compensating current 105 is generated due to this infeed. In other words, the second current source 104 also generates the compensating current 105. In this case, the generated compensating current 105 compensates at least part of the measuring current 101.

This figure furthermore shows a detection circuit 106 that is realized in the form of a voltage measurement carried out at a first junction 114 by the microcontroller 113 in this case. The detection circuit 106 is designed for detecting a deviation of the value of the measuring current from a nominal value 107 by means of the compensation principle, namely on the basis of the compensating current. In this case, the nominal value of the measuring current in the flawless state is symbolically illustrated in the form of a square in a storage element 116 that is situated within the second voltage source. The square symbolizes the stored nominal value.

The arrows 117 indicate that a user can choose between different values that are subsequently fed into the first electric circuit 109 in the form of a testing current 110. In this case, the squares 118 and 119 symbolize values for the testing current that correspond to a multiple of the nominal value, for example, 0.5-times or 1.2-times the nominal value. As already described above, the nominal value is made available by the second current source 104 as a value of the testing current if the square 107 is selected. In other words, the squares 107, 118 and 119 symbolize the choice of a default testing current by a user.

This figure furthermore shows a current-sensing resistor unit 108 that may be realized in the form of an electrical resistor, for example, an ohmic resistor. The figure clearly shows that the compensating current 105 flows and the compensating voltage drops between the first junction 114 and the second junction 115. Since the testing current is fed in at the junction 114, the addition of all currents physically takes place at this location. A voltage can also be tapped at this comparison point as shown. In FIG. 1, this voltage is tapped at the junction 114 by a microcontroller 113. Depending on the potential of the microcontroller, this voltage may also correspond to the compensating voltage.

FIG. 1 clearly shows that the second current source 104 feeds the testing current 110 into the first electric circuit at a first junction 114 that serves as comparison point. The infeed of the testing current in turn causes the compensating current 105 to respectively develop in accordance with the ratio between the present measuring current 101 and the chosen value of the testing current 110. The fact that the measuring current and the testing current are load-independent output currents results in the same current flowing at the input and at the output of the first current source and the same electrical current also flowing at the input and at the output of the second current source.

In this exemplary embodiment of the invention, the detection of a deviation is realized by transmitting the voltage applied to the junction 114 to the microcontroller 113. Several expectancy values 111 can be stored therein. These expectancy values depend on the previously described potential values of the testing current symbolized by the squares 107, 118 and 119 in the first current source. The first Kirchhoff law, according to which the sum of the inflowing currents in an electrical junction must be identical to the sum of the outflowing currents, applies to the first junction 114, as well as to the second junction 115. Consequently, the following relationships for the testing current $I_{test}$ and the measuring current $I_{measuring\ current}$ apply:

$I_{test} = I_1 + I_{measuring\ current}$ applies to the first junction 114 and $I_{measuring\ current} = I_2 + I_{test}$ applies to the second junction 115. A current $I_1 = -I_2$ flows if the two currents $I_{measuring\ current}$ and $I_{test}$ are unequal. In this case, $I_1$ is symbolized with 120 in FIG. 1 and $I_2$ is symbolized with the arrow 121 in FIG. 1. A compensating voltage $U_{compensation} = I_1 \times R_{current-sensing\ resistor}$ is created at the current-sensing resistor unit 108. If the two currents $I_{measuring\ current}$ and $I_{test}$ are equally high, $I_1$ and $I_2$ are equal to zero. No voltage is created at 108. This example describes the instance, in which the second current source outputs a testing current that is equal to the nominal value of the measuring current, i.e., in which the square 107 is chosen by a user.

This figure furthermore shows that the current generating device features a first region 102 that can fulfill enhanced safety requirements. For example, this may be requirements of the standard SIL3 or SIL4. The arrows pointing from the microcontroller 113 to the current sources likewise indicate that the microcontroller adjusts and controls the two current sources.

After a measurement of the compensating voltage, it is compared with the expectancy value corresponding to the value of the testing current being fed in and, if applicable, a deviation is detected and output for the user in the form of a signal.

In other words, the measuring current 101 can be monitored with respect to its value by means of the current generating device illustrated in FIG. 1 such that it is possible to prevent non-linearities, influences of temperature fluctuations, resolutions, for example, of analog/digital converters or inaccuracies of references, all of which are used in external monitoring circuits in order to monitor a measuring current. In other words, an advantage of the current generating device can be seen in that no external monitoring circuit is required, in which the aforementioned disadvantages can occur.

The sensor 102 consists of a level meter or a pressure sensor for a container or of a flow sensor. The current generating device 100 may also be integrated into the sensor or into an evaluation device.

Figure 2:
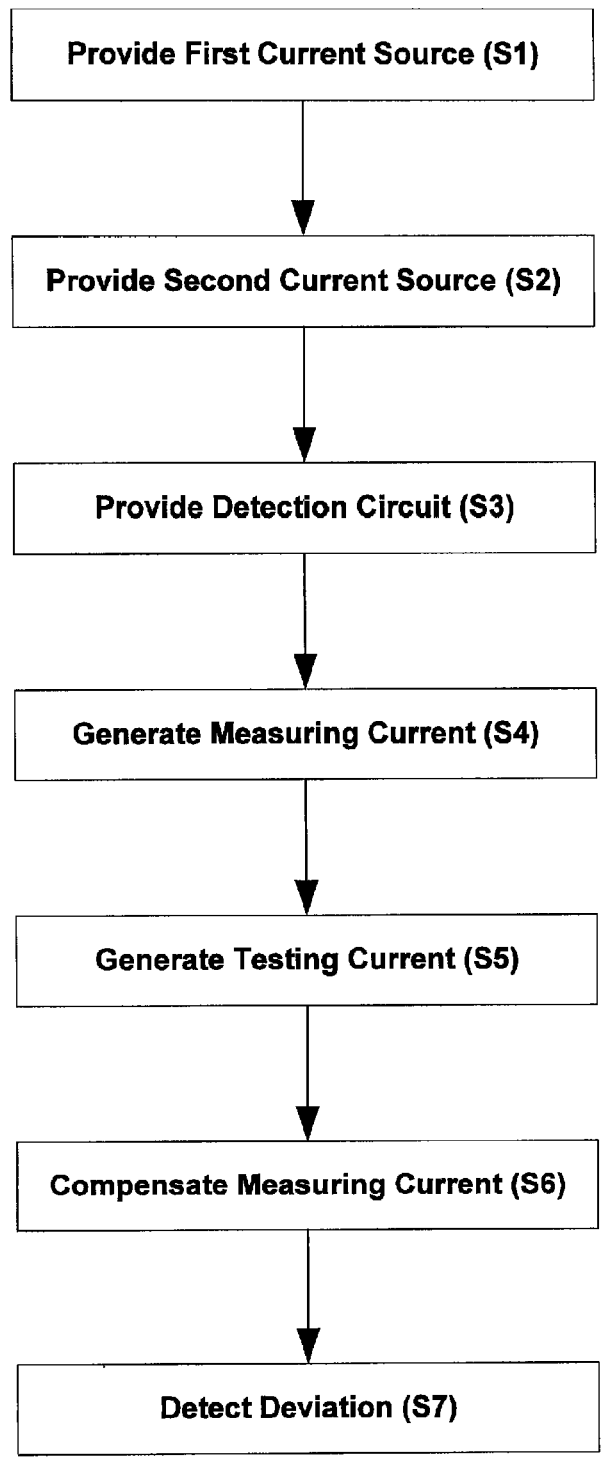
FIG. 2 shows a flow chart of a method according to one exemplary embodiment of the invention.

FIG. 2 shows a method for the generation and simultaneous monitoring of a measuring current for a sensor. A first current source is provided in step S1 and a second current source is provided in step S2. Furthermore, a detection circuit for detecting a deviation of the measuring current is provided in step S3.

A measuring current is generated by means of the first current source in step S4, wherein the generation of the compensating current is realized with the second current source (step S5). At least part of the measuring current is compensated by the compensating current (step S6), wherein a deviation of the measuring current from a nominal value is subsequently detected on the basis of the compensating current (step S7).

In this case, it may be possible, for example, to utilize an electric circuit, in which the compensation principle is used for monitoring the measuring current. If a voltage with an expectancy value other than that corresponding to the testing current drops between two predetermined points, for example, between a comparison point and a microcontroller, a detection result can be forwarded to a user.

The invention claimed is:
1. An arrangement, comprising:
one of a level meter, a pressure gauge, and a flow meter; and a current generating device for generation and simultaneous monitoring of a measuring current, which reflects one of (i) a fill level measured by the level meter, (ii) a pressure measured by the pressure gauge and (iii) a fluid flow measured by the flow meter wherein the current generating device comprises:

a first current source generating the measuring current;

a second current source generating a testing current in order to compensate at least part of the measuring current; and a detection circuit detecting a deviation of the measuring current from a nominal value on the basis of a compensation current, which is a sum of the testing current and the measuring current.

2. The current generating device of claim 1, wherein the first current source supplies a first electric circuit; wherein the second current source feeds the testing current into the first electric circuit; and wherein the current generating device is configured so that the infeed of the testing current generates the compensation current.

3. The current generating device of claim 1, wherein the current generating device is configured so that, if the testing current corresponds to the nominal value, a compensation current other than zero is only generated if the measuring current deviates from the nominal value.

4. The current generating device of claim 1, wherein at least the measuring current or the testing current is a load-independent current.

5. The current generating device of claim 1, wherein the detection of the deviation is performed using a voltage measurement.

6. The current generating device of claim 1, wherein the second current source is arranged in a first region; and wherein the first region fulfills enhanced safety requirements.

7. The current generating device of claim 1, wherein the current generating device is designed for a 4-20 mA two-wire loop.

8. The current generating device of claim 1, furthermore comprising: a current-sensing resistor unit; wherein the compensation current flows through the current-sensing resistor unit.

9. The current generating device of claim 8, wherein the current generating device is configured so that, if the testing current corresponds to a multiple of the nominal value, the deviation is detected on the basis of an expectancy value other than zero for a voltage at the current-sensing resistor unit.

10. A method for the generation and simultaneous monitoring of a measuring current, which reflects one of a fill level measured by a level meter, a pressure measured by a pressure gauge, and a fluid flow measured by a flow meter, comprising:

providing a first current source;

providing a second current source;

providing a detection circuit for detecting a deviation of the measuring current from a nominal value;

generating a measuring current using the first current source;

generating a testing current using the second current source;

compensating at least part of the measuring current with the testing current; and detecting a deviation of the measuring current from the nominal value as a function of a compensation current, which is a sum of the testing current and the measuring current.

11. A non-transitory computer-readable medium, on which a program element is stored that instructs a processor to carry out the following steps when it is executed on the processor:

providing a first current source;

providing a second current source;

providing a detection circuit for detecting a deviation of a measuring current from a nominal value, wherein the measuring current reflects one of a fill level measured by a level meter, a pressure measured by a pressure gauge and a fluid flow measured by a flow meter;

generating the measuring current using the first current source;

generating a testing current using the second current source;

compensating at least part of the measuring current with the testing current; and detecting a deviation of the measuring current from the nominal value as a function of a compensation current, which is a sum of the testing current and the measuring current.

* * * * *